United States Patent [19]

Sumser et al.

[11] Patent Number: 5,361,454
[45] Date of Patent: Nov. 8, 1994

[54] SNAP-ON SWIVEL WHEEL ASSEMBLY

[75] Inventors: Daniel P. Sumser, North Canton; Michael P. Green, Youngstown, both of Ohio

[73] Assignee: Century Products Company, Macedonia, Ohio

[21] Appl. No.: 101,511

[22] Filed: Aug. 2, 1993

[51] Int. Cl.⁵ .............................................. B60B 33/00
[52] U.S. Cl. ...................... 16/20; 301/111; 16/31 A
[58] Field of Search ............... 301/1, 111, 112, 115, 301/117, 120, 122; 16/18 R, 45, 20, 22, 29, 30, 42 R, 42 T, 31 A, 31 R, 47, 48

[56] References Cited

U.S. PATENT DOCUMENTS

| | | | |
|---|---|---|---|
| 4,102,172 | 7/1978 | Iiyoshi | 16/31 R X |
| 4,107,817 | 8/1978 | Sloan | 16/20 |
| 4,229,855 | 10/1980 | Rowe | 16/31 R X |
| 4,897,895 | 2/1990 | Wang | 16/20 |
| 5,237,721 | 8/1993 | Andrisin, III | 16/20 |

FOREIGN PATENT DOCUMENTS 0154401  6/1988  Japan ..................... 16/29

*Primary Examiner*—Russell D. Stormer
*Attorney, Agent, or Firm*—Graham & James

[57] ABSTRACT

A modular wheel assembly for use with apparatus having a weight-bearing frame, such as a baby stroller, includes a mounting unit consisting of a cylindrical tubular member having an open upper end and a closed lower end wall. The tubular member is dimensioned to receive the lower end of a tubular frame member of the apparatus. A wheel supporting unit includes a cylindrical sleeve portion dimensioned to receive the tubular member of the mounting unit in close tolerance, freely rotating fashion. The sleeve portion and mounting unit are dimensioned so that the weight supported by the frame member is transferred through the bearing flange of the mounting unit to the cylindrical sleeve portion of the wheel supporting unit. An axle tube extends perpendicularly through lower end portions of the web members to be supported thereby. The axle tube is adapted to receive an axle therethrough, with a pair of wheels secured to opposed ends of the axle. A fastener comprised of a disc and a barb-like fastener extending coaxially therefrom is dimensioned to extend compressively through a hole in the lower end wall of the mounting unit, and to expand therein and be retained in a snap-engagement.

10 Claims, 4 Drawing Sheets

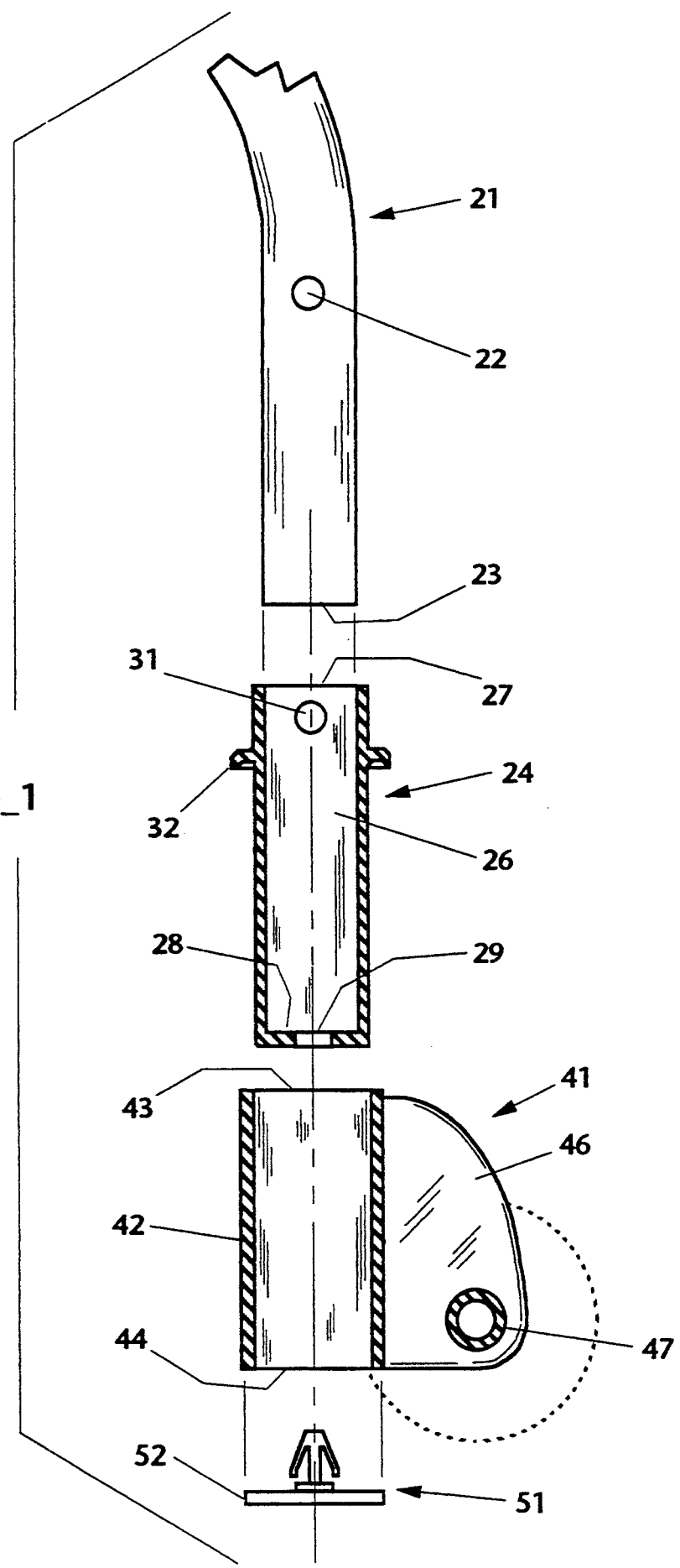
Figure_1

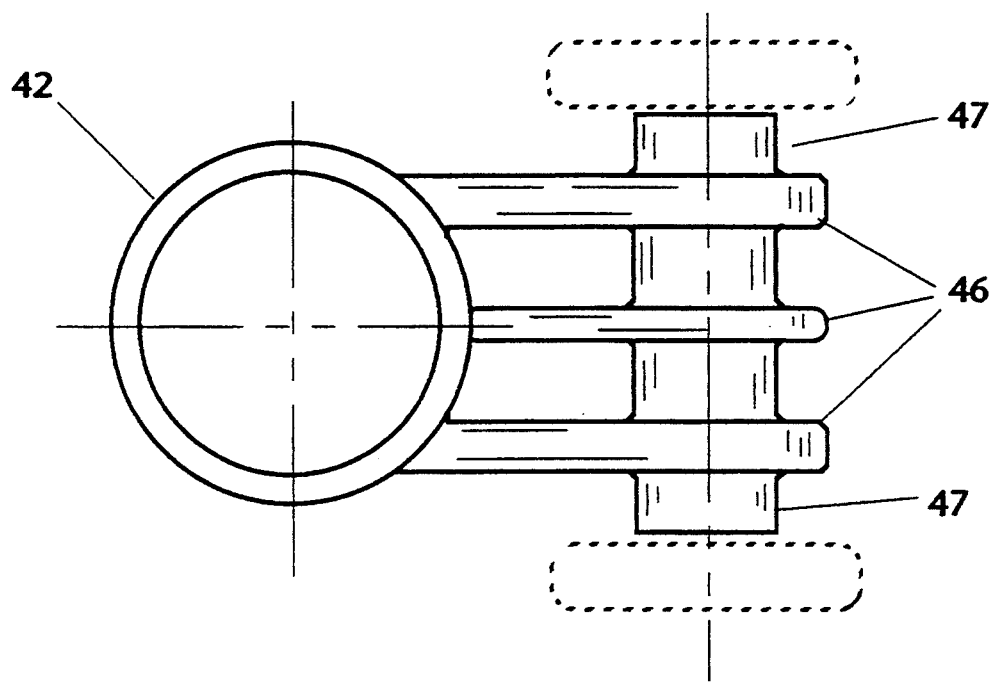
Figure_4
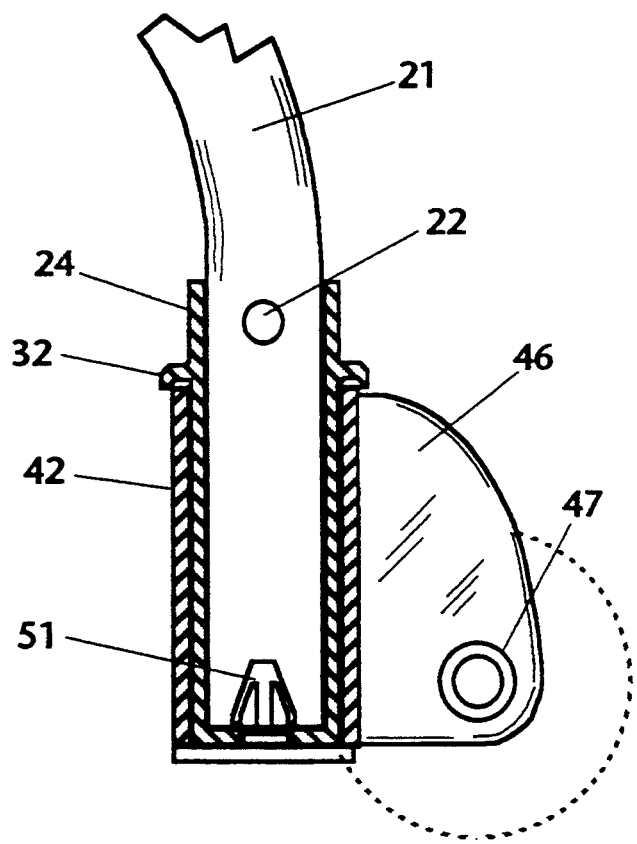
Figure_2
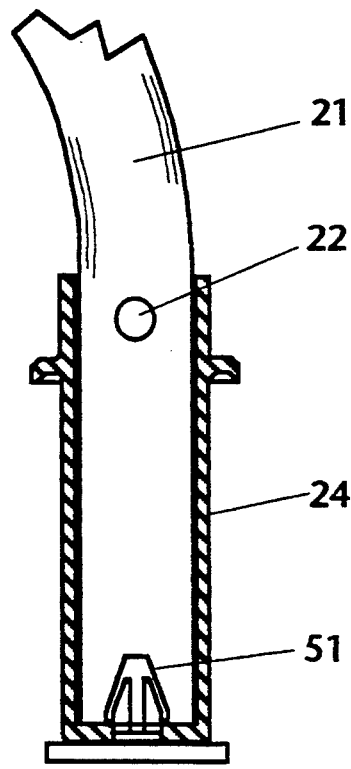
Figure_3

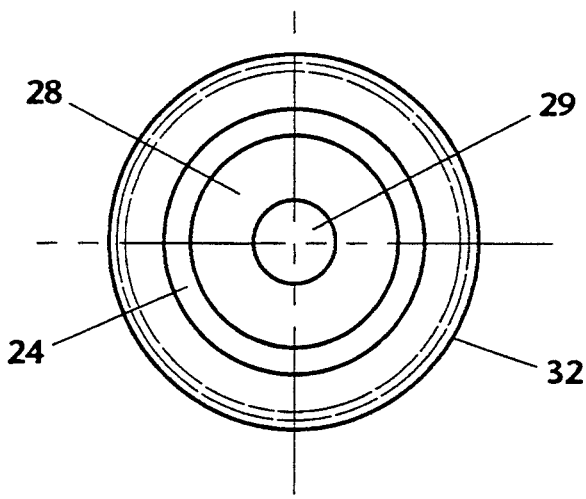
Figure_5
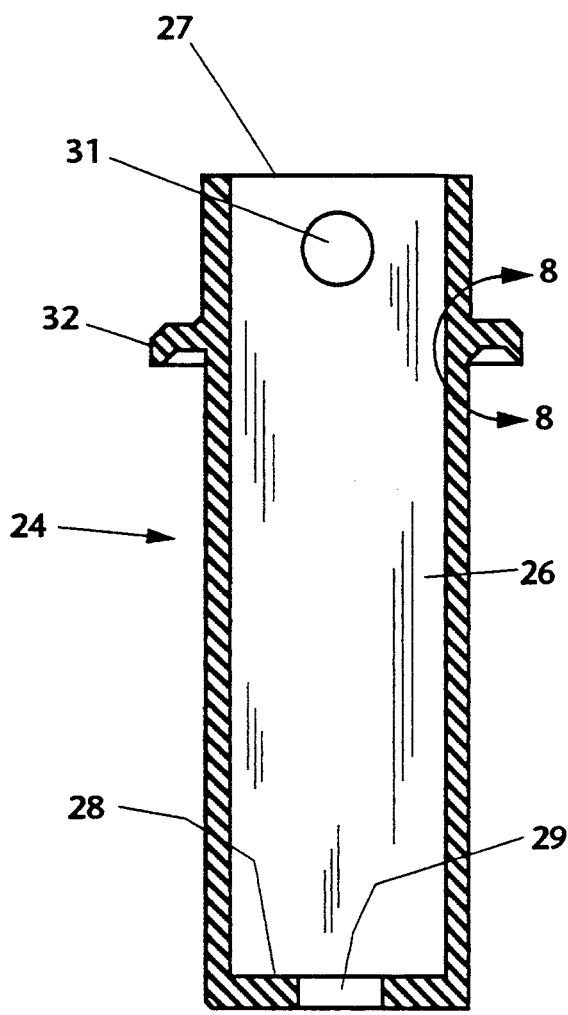
Figure_6
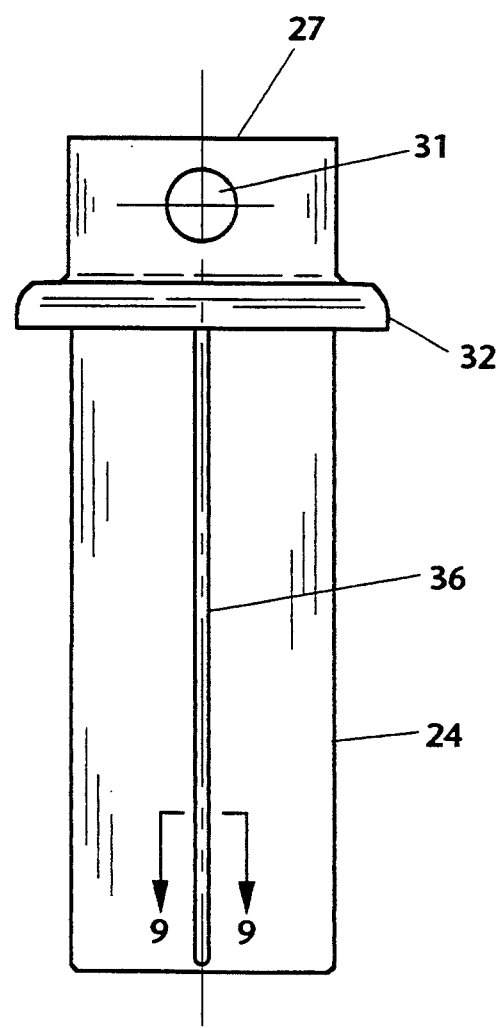
Figure_7

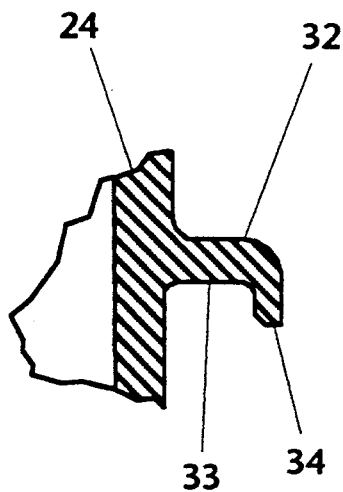
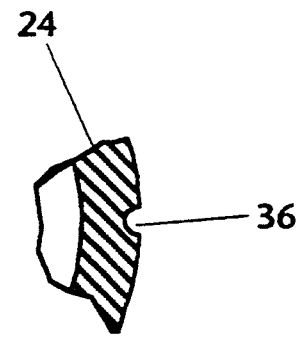
Figure_8
Figure_9
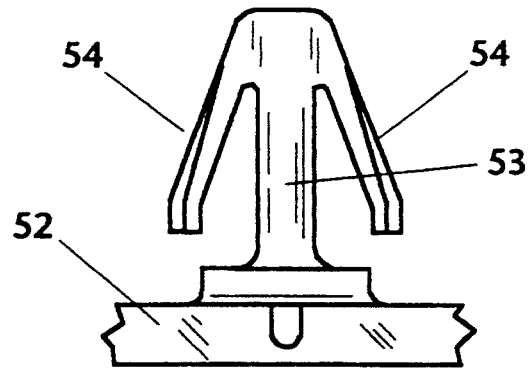
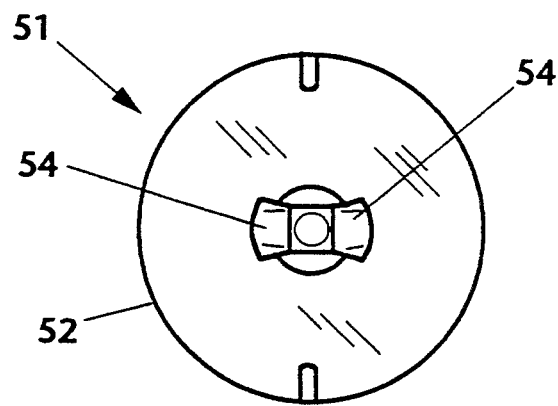
Figure_11
Figure_10
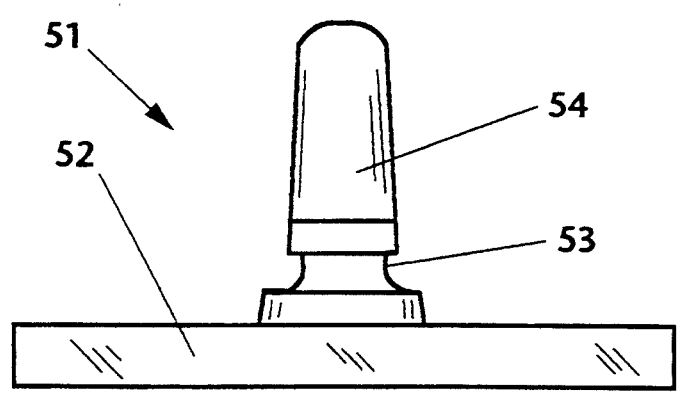
Figure_12

SNAP-ON SWIVEL WHEEL ASSEMBLY

BACKGROUND OF THE INVENTION

This invention generally relates to wheel assemblies for supporting weight-bearing frame structures, and more particularly to swivel wheel assemblies for use with baby strollers, baby carriages, high chairs, walkers, seats, and similar perambulatory furniture for children and babies.

Many forms of baby furniture include wheel assemblies to facilitate movement of babies and children, repositioning of furniture, etc. It is a commonplace expedient to ship and store such items in knock-down condition, thereby economizing on space and shipping charges. The items are assembled either at the point of sale by mechanically trained workers or at the point of use by the buyer. A current trend in sales of such items is toward discount marketing, in which the items are sold in knock-down condition, and the buyer is required to assemble the components. Many customers do not have sufficient mechanical skills, and further lack the tools required for assembly of the knock-down apparatus. Thus there is a growing need for knock-down assemblies that require few or no tools and that require only rudimentary mechanical skill and manual dexterity.

There is also a trend in manufacturing toward a modular approach in which a plurality of items in a product line are designed to incorporate the same modular components. This approach requires a broad vision of a product line and particular attention to detail, so that the modules interfit across the product line.

More specifically with respect to baby furniture, many strollers, high chairs, carriages, and the like employ wheel assemblies to facilitate movement of the child or repositioning of the furniture for convenience and cleaning purposes, and the like. A modular wheel assembly for such broad use would be advantageous. Likewise, a modular wheel assembly should be easily assembled to the apparatus or furniture to ease the assembly of items in knock-down condition. There is a lack of such a modular wheel assembly in the prior art.

SUMMARY OF THE INVENTION

The present invention generally comprises a modular wheel assembly for use with apparatus having a weight-bearing frame, such as baby strollers, carriages, chairs, and similar furniture. Salient features of the modular wheel assembly are that it is adapted to snap-engage a frame member of the apparatus for quick assembly with no tools, while also providing pivotal movement about the frame member for steering purposes as well as rotation of the wheels for rolling transport.

The modular wheel assembly includes a mounting unit consisting of a cylindrical tubular member having an open upper end and a closed lower end wall. The tubular member is dimensioned to receive the lower end of a tubular frame member in close tolerance fit, and a rivet or screw extends through aligned holes in the tubular member and frame member to join the two members permanently. An annular bearing flange extending radially outwardly from an upper portion of the mounting unit includes a concave lower annular surface. The lower end wall of the tubular member is provided with a hole extending coaxially therethrough.

The wheel assembly further incorporates a wheel supporting unit, including a cylindrical sleeve portion having open upper and lower ends. The sleeve portion is dimensioned to receive the tubular member of the mounting unit in close tolerance, freely rotating fashion. The sleeve portion and mounting unit are dimensioned so that the weight supported by the frame member is transferred through the bearing flange of the mounting unit to the cylindrical sleeve portion of the wheel supporting unit. The annular bearing flange is formed of a rugged, self-lubricating polymer material, such as nylon TM or Delrin TM, and the entire mounting unit and sleeve portion may be fabricated of similar materials.

Extending from the exterior of the sleeve portion are a plurality of planar web members disposed in parallel relationship to the axis of the sleeve portion. The web members extend substantially the entire length of the sleeve portion, and an axle tube extends perpendicularly through lower end portions of the web members to be supported thereby. The axle tube is dimensioned to receive an axle therethrough, with a pair of wheels secured to opposed ends of the axle. Thus the wheel supporting unit provides rolling support to the frame member, and the conjunction of the wheel supporting unit and the mounting unit provides pivotal motion to the wheels for steering purposes.

The invention also includes a fastener member comprised of a disc having a diameter similar to the outer diameter of the sleeve portion, and a barb-like fastener extending coaxially from the upper surface of the disc. The fastener is dimensioned to be extended compressively through the hole in the lower end wall of the mounting unit, and to expand therein and be retained. Thus the fastener member secures the sleeve portion concentrically about the mounting unit in freely rotation fashion. It is significant to note that the fastener member is snap-engaging, so that no tools are required to secure the wheel supporting unit to the mounting unit.

To use the components of the invention, the mounting unit is first secured to the lower end of the frame member with a rivet or screw or the like. This step is preferably carried out during the manufacturing process. The apparatus may then be shipped in knock-down condition to the ultimate point of sale or use, where it is assembled. The tubular mounting unit is inserted through the sleeve portion of the wheel support unit, and the fastener is snap-engaged in the mounting unit to retain the wheel support unit on the mounting unit. The wheels and axle may then be secured to the axle tube, or this wheel assembly step may have been carried out during the manufacturing process.

It should be noted that the mounting unit secured to the frame member may serve as a foot or support base for the frame member, and the wheel supporting unit may comprise an accessory in situations in which the rolling transport of the apparatus is optional.

BRIEF DESCRIPTION OF THE DRAWING

FIG. 1 is a partially cross-sectioned exploded view of the components of the snap-on swivel wheel assembly of the invention.

FIG. 2 is a cross-sectional side view of the snap-on swivel wheel assembly, shown joined to a typical frame member.

FIG. 3 is a cross-sectional side view of the mounting unit of the wheel assembly, shown joined to a typical frame member as a foot support.

FIG. 4 is a top view of the wheel support unit of the snap-on swivel wheel assembly.

FIG. 5 is a top view of the mounting unit of the snap-on swivel wheel assembly.

FIG. 6 is a cross-sectional elevation of the mounting unit depicted in FIG. 5.

FIG. 7 is a side elevation of the mounting unit depicted in FIGS. 5 and 6.

FIG. 8 is an enlarged cross-sectional view of the annular bearing flange of the mounting unit, taken along line 8—8 of FIG. 6.

FIG. 9 is an enlarged cross-sectional view of the longitudinal groove of the mounting unit, taken along line 9—9 of FIG. 7.

FIG. 10 is a top view of the fastener member of the snap-on swivel wheel assembly.

FIG. 11 is an enlarged side view of the barb-like portion of the fastener member depicted in FIG. 10.

FIG. 12 is an enlarged end view of the barb-like portion of the fastener member depicted in FIGS. 10 and 11.

DESCRIPTION OF THE PREFERRED EMBODIMENT

The invention generally comprises a snap-on swivel wheel assembly for use with baby strollers, carriages, chairs, and similar apparatus. With regard to FIG. 1, the invention is adapted to be used in combination with a frame member 21 of a weight-bearing apparatus, the frame member 21 being provided with a hole 22 extending therethrough and spaced apart from the distal lower end 23 thereof.

The snap-on swivel wheel assembly includes a mounting unit 24 (FIGS. 5-7) consisting of a cylindrical tubular member defining a central opening 26 having an open upper end 27 and a closed lower end wall 28. The central opening 26 is dimensioned to receive the lower end portion of the frame member 21 in close tolerance fit. A hole 29 extends axially through the lower end wall 28, and a hole 31 extends through the side wall of the tubular member. The hole 31 is positioned to be aligned with the hole 22 in the frame member 21, so that a rivet, screw, pin, or the like may be used to join the tubular member 24 is secured permanently and concentrically to the frame member.

Extending outwardly from an upper end portion of the tubular member 24 is an annular bearing flange 32, also shown in FIG. 8. The flange 32 is provided with an annular bearing surface 33, and an annular drop edge 34 extending downwardly from the outer edge of the flange. The flange 32, and preferably the entire tubular member 24 is formed of a tough, lubricous polymer, such as nylon, Delrin, or the like. The tubular member 24 further includes at least one, and preferably a pair of grooves 36 extending longitudinally in the outer surface thereof, from the flange 32 to the lower end wall 28. The grooves 36 provide circumferential stress relief to the peripheral bearing surface of the tubular member 24, and may also serve to retain a lubricant.

The wheel assembly further includes a wheel supporting unit 41, including a cylindrical tubular sleeve portion 42 having open upper and lower ends 43 and 44, respectively. The sleeve portion 42 is dimensioned to receive the tubular member 24 of the mounting unit concentrically therein in close tolerance, freely rotating fashion. The sleeve portion 42 and mounting unit 24 are dimensioned so that the weight supported by the frame member is transferred through the bearing flange 32 of the mounting unit 24 to the cylindrical sleeve portion 42 of the wheel supporting unit 41. The sleeve portion 42 may also be fabricated of a rugged, self-lubricating polymer material, such as nylon or Delrin.

A plurality of planar web members 46 extend from the exterior of the sleeve portion 42 in parallel relationship to the axis of the sleeve portion, as shown in FIG. 4. The web members 46 extend substantially the entire length of the sleeve portion 42, and flare in a smooth curve outwardly from the upper end 43 to the lower end 44. An axle tube 47 extends perpendicularly through lower end portions of the web members 46 to be supported thereby, the axle tube 47 extending perpendicularly to the axis of the sleeve portion and spaced apart therefrom. The axle tube 47 is dimensioned to receive an axle therethrough, with a pair of wheels secured to opposed ends of the axle. The wheel supporting unit provides rolling support to the frame member, and the conjunction of the wheel supporting unit 41 and the mounting unit 24 permits pivotal motion for the wheels for steering purposes.

The invention further provides a fastener member 51 for joining the wheel supporting unit to the mounting unit in freely rotating fashion. With regard to FIGS. 10-12, the fastener member 51 includes a disc 52 having a diameter greater than the inner diameter of the sleeve portion 42 of the wheel mounting unit. Extending upwardly from the upper surface of the disc 52 is a stem 53, and a pair of detent arms 54 extend in downwardly flaring fashion from the upper end of the stem 53. The arms 54 are resilient, and the distal spread of the arms 54 is greater than the diameter of the hole 29 in the lower end of the mounting unit 24. With the sleeve portion 42 assembled concentrically about the mounting unit 24, the arms 54 are urged upwardly through the hole 29, deflecting as they pass through the hole 29. The arms expand resiliently within the space 26 to be retained by the end wall 28, as shown in FIG. 2, thus retaining the wheel mounting unit on the mounting unit. The fastener member 51 is anchored in the mounting unit 24 in snap-engaging fashion, requiring only manual force and no tools to effect a permanent conjunction and assembly.

Generally speaking, the mounting unit 24 is first secured to the lower end of the frame member 21 with a rivet or screw or the like. This step is preferably carried out during the manufacturing process. The apparatus may then be shipped in knock-down condition to the ultimate point of sale or use, where it is assembled. The tubular mounting unit 24 is inserted through the sleeve portion 42 of the wheel support unit 41, and the fastener 51 is snap-engaged in the mounting unit 24 to retain the wheel support unit 41 on the mounting unit, as shown in FIG. 2. The wheels and axle may then be secured to the axle tube, or this wheel assembly step may have been carried out during the manufacturing process.

It may be appreciated that the mounting unit 24 secured to the frame member 21 may serve as a foot or support base for the frame member, and the wheel supporting unit 41 may comprise an accessory in situations in which the rolling transport of the apparatus is optional. Thus, as shown for example in FIG. 3, the fastener 51 may comprise a base for the mounting unit 24, and the wheel supporting unit may be omitted, or added at a later time.

The foregoing description of the preferred embodiment of the invention have been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A modular wheel assembly for use with a weight-bearing frame member, including;
   a wheel supporting unit, including a sleeve portion, and axle tube, and means for joining said sleeve portion and said axle tube;
   mounting means for joining said wheel supporting unit to the frame member in freely pivoting fashion; and
   snap-engaging means for securing said wheel supporting unit to said mounting means;
   wherein said mounting means includes a tubular member having upper and lower ends, said tubular member being adapted to be secured to the frame member and dimensioned to be inserted within an upper end of said sleeve portion of said wheel supporting unit;
   wherein said mounting means further includes annular bearing means extending from said tubular member and disposed to transfer weight from said tubular member to said sleeve portion while maintaining said freely pivoting engagement of said mounting means and said wheel supporting unit;
   wherein said annular bearing means includes an annular bearing flange extending outwardly from said tubular member to engage said upper end of said sleeve portion; and
   wherein said annular bearing flange includes an annular bearing surface for impinging on said upper end of said sleeve portion, and an annular drop edge extending integrally from said bearing surface to engage and retain a peripheral surface portion of said sleeve portion.

2. A modular wheel assembly for use with a weight-bearing frame member, including;
   a wheel supporting unit, including a sleeve portion, and axle tube, and means for joining said sleeve portion and said axle tube;
   mounting means for joining said wheel supporting unit to the frame member in freely pivoting fashion; and
   snap-engaging means for securing said wheel supporting unit to said mounting means;
   wherein said mounting means includes a tubular member having upper and lower ends, said tubular member being adapted to be secured to the frame member and dimensioned to be inserted within an upper end of said sleeve portion of said wheel supporting unit;
   wherein said snap-engaging means includes a fastener member impinging on a lower end of said sleeve portion, said fastener member including detent means for snap-engaging said lower end of said tubular member; and
   wherein said fastener member includes a disc having a diameter greater than said tubular member, and said detent means extends upwardly from said disc.

3. The modular wheel assembly of claim 2, wherein said detent means includes a stem extending upwardly from said disc, and a plurality of resilient arms extending from said stem and flaring outwardly and downwardly.

4. The modular wheel assembly of claim 3, wherein said tubular member includes a hole in said lower end thereof, and said plurality of resilient arms are dimensioned to be urged through said hole in a state of resilient compression and to expand within said tubular member to be retained therein.

5. A modular wheel assembly for use with a weight-bearing frame member, including;
   a wheel supporting unit, including a sleeve portion, and axle tube, and means for joining said sleeve portion and said axle tube;
   mounting means for joining said wheel supporting unit to the frame member in freely pivoting fashion; and
   snap-engaging means for securing said wheel supporting unit to said mounting means;
   wherein said mounting means includes a tubular member having upper and lower ends, said tubular member being adapted to be secured to the frame member and dimensioned to be inserted within an upper end of said sleeve portion of said wheel supporting unit;
   further including aligned holes in said tubular member and the frame member, and a fastener extending through said aligned holes to join said tubular member to said frame member, wherein said tubular member includes an internal cavity dimensioned to receive the frame member in close tolerance fit;
   wherein said tubular member includes a closed lower end wall having a hole for receiving said snap-engaging means.

6. A stroller wheel assembly for rotatable attachment to a stroller frame, comprising:
   a wheel supporting unit (41), at least two web portions (46) supporting an axle (47), said tube supporting a wheel, and a tubular sleeve (42) traverse to said axle and having a longitudinal axis;
   a tubular member (24), having a longitudinal axis, and coaxial with said tubular sleeve axis, having an open upper end (27) and a substantially closed lower end, said closed end having an aperture (29) therein, said tubular member sized to fit inside said tubular sleeve;
   a fastener member (51), said fastener member passing through said aperture in said lower end of said tubular member, and abutting said tubular sleeve, to fasten together said tubular member and said tubular sleeve of said wheel supporting unit, to prevent axial separation of said tubular member and said tubular sleeve, while allowing said tubular sleeve to rotate about said tubular member.

7. The wheel assembly according to claim 6, wherein said fastener member includes detent means for snap-engaging said tubular member and said tubular sleeve, said detent means extending upwardly from said disc.

8. The wheel assembly according to claim 6, wherein said tubular member has on its periphery a flange (32), said flange spaced from said open upper end (27) and acting to limit the entry of said tubular member into said tubular sleeve.

9. The wheel assembly according to claim 8, wherein said tubular member has an aperture (31) on its side wall, and said frame (21) has a corresponding aperture (22), wherein said side wall and frame apertures may be aligned to fix said tubular member to said frame.

10. The wheel assembly according to claim 6, wherein there are three said web portions (46) supporting said axle (47), and said axle is a hollow tube.

* * * * *